United States Patent
Feige et al.

(10) Patent No.: US 9,866,005 B2
(45) Date of Patent: Jan. 9, 2018

(54) PERFECTED DEVICE FOR FIXING ELONGATED BODIES, IN PARTICULAR COAXIAL WIRES, TO A SUPPORTING CABLE

(71) Applicant: FI.MO.TEC. S.P.A., Cologno Monzese-Milan (IT)

(72) Inventors: Carlo Feige, Milan (IT); Alberto Varale, Milan (IT); Massimo Bottazzoli, Milan (IT)

( * ) Notice: Subject to any disclaimer, the term of this patent is extended or adjusted under 35 U.S.C. 154(b) by 0 days.

(21) Appl. No.: 14/897,322

(22) PCT Filed: Oct. 15, 2014

(86) PCT No.: PCT/EP2014/002783
§ 371 (c)(1),
(2) Date: Dec. 10, 2015

(87) PCT Pub. No.: WO2015/062702
PCT Pub. Date: May 7, 2015

(65) Prior Publication Data
US 2016/0254656 A1    Sep. 1, 2016

(30) Foreign Application Priority Data
Oct. 28, 2013    (IT) .............................. MI2013A1785

(51) Int. Cl.
*H02G 7/08*  (2006.01)
*H02G 3/32*  (2006.01)
*F16L 3/10*  (2006.01)
*H01B 11/00*  (2006.01)

(52) U.S. Cl.
CPC .............. *H02G 7/08* (2013.01); *F16L 3/1075* (2013.01); *H01B 11/007* (2013.01); *H02G 3/32* (2013.01)

(58) Field of Classification Search
CPC .......... H02G 7/08; H02G 3/32; H01B 11/007; F16L 3/1075; F16L 3/2235; G60H 1/00557
USPC ........ 248/221.12, 68.1, 49, 58, 62, 65, 74.1, 248/74.2, 74.3, 74.4; 24/336
See application file for complete search history.

(56) References Cited

U.S. PATENT DOCUMENTS 3,913,187 A    10/1975  Okuda
4,156,795 A *   5/1979  Lacan .................. H01R 25/161
                                              174/101

(Continued)

FOREIGN PATENT DOCUMENTS

EP    2461078 A1    6/2012

*Primary Examiner* — Kimberly Wood
(74) *Attorney, Agent, or Firm* — Themis Law

(57) ABSTRACT

A device for fixing elongated bodies to a supporting cable includes a body containing a seat for the supporting cable and a seat for the elongated body, wherein, for the independent closing of the seats, a lid is provided that closes the seat of the supporting cable and a lid that closes the seat of the elongated body. A device according to the invention offers the advantage of not requiring the perfect positioning of the coaxial wire with respect to the supporting cable by having a distinct or separate system for fixing the device onto the coaxial wire and supporting cable, respectively. Another advantage of a device according to the invention lies in its autonomy because it does not require additional elements for consolidating the installation.

3 Claims, 5 Drawing Sheets

(56) References Cited

U.S. PATENT DOCUMENTS

| | | | | |
|---|---|---|---|---|
| 4,240,604 A * | 12/1980 | Brach | ............... | E05C 19/066 248/316.5 |
| 4,564,163 A * | 1/1986 | Barnett | ............... | F16L 3/12 24/16 PB |
| 4,669,156 A * | 6/1987 | Guido | ............... | F16L 3/2235 24/297 |
| 4,775,121 A * | 10/1988 | Carty | ............... | F16L 3/2235 24/543 |
| 4,840,333 A * | 6/1989 | Nakayama | ............... | F16B 5/12 248/68.1 |
| 4,864,082 A * | 9/1989 | Ono | ............... | H02G 3/0437 138/115 |
| 4,881,705 A * | 11/1989 | Kraus | ............... | F16L 3/08 248/68.1 |
| 5,029,782 A * | 7/1991 | Andre | ............... | F16L 3/2235 248/68.1 |
| 5,184,794 A * | 2/1993 | Saito | ............... | F16L 3/13 248/316.5 |
| 5,257,768 A * | 11/1993 | Juenemann | ............... | F16L 55/035 248/604 |
| 5,274,194 A * | 12/1993 | Belcher | ............... | H02G 3/0418 174/50 |
| 5,613,655 A * | 3/1997 | Marion | ............... | F16L 3/2235 24/339 |
| 5,669,590 A * | 9/1997 | Przewodek | ............... | F16L 3/221 248/68.1 |
| 5,820,048 A * | 10/1998 | Shereyk | ............... | F16L 3/1215 24/487 |
| 6,084,180 A * | 7/2000 | DeBartolo, Jr. | ............... | H02G 3/0418 174/101 |
| 6,154,927 A * | 12/2000 | Oi | ............... | F16C 11/10 16/342 |
| 6,528,728 B1 * | 3/2003 | Shima | ............... | H02G 3/0437 174/101 |
| 6,565,049 B2 * | 5/2003 | Hahn | ............... | B60R 16/0215 248/68.1 |
| 7,172,162 B2 * | 2/2007 | Mizukoshi | ............... | F16L 3/2235 248/49 |
| 7,380,758 B2 * | 6/2008 | Hauser | ............... | F16L 3/2235 248/68.1 |
| 7,614,593 B2 * | 11/2009 | McClure | ............... | E21B 17/1035 248/229.14 |
| 7,770,850 B2 * | 8/2010 | Allmann | ............... | F16L 3/2235 248/65 |
| 7,887,012 B2 * | 2/2011 | Desai | ............... | F16L 3/1075 24/530 |
| 9,038,247 B2 * | 5/2015 | Dodge | ............... | F16G 11/101 24/115 K |
| 2007/0018057 A1 | 1/2007 | Kovac | | |
| 2007/0215757 A1 * | 9/2007 | Yuta | ............... | F16L 55/035 248/68.1 |

\* cited by examiner

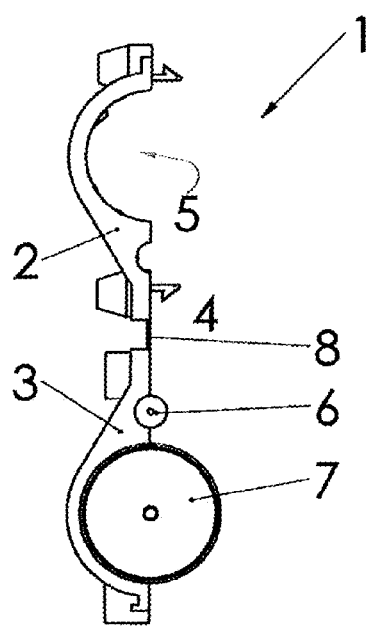
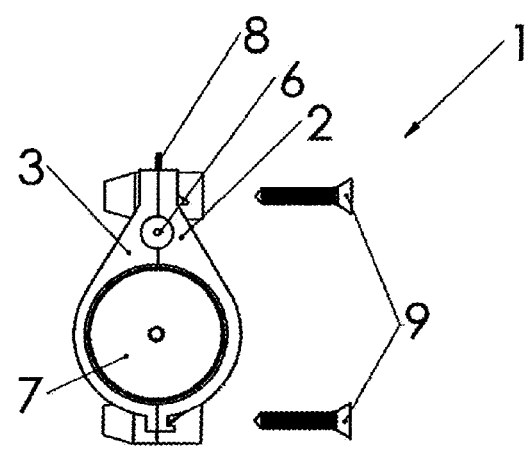
Fig. 1A
(Prior Art)
Fig. 1B
(Prior Art)

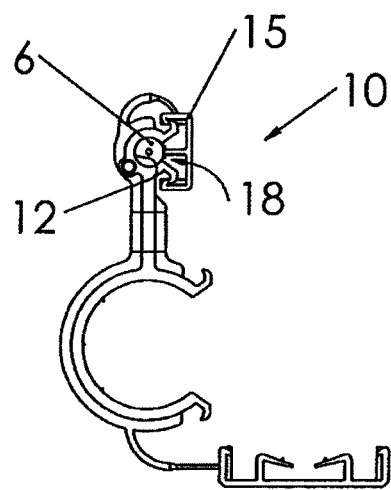
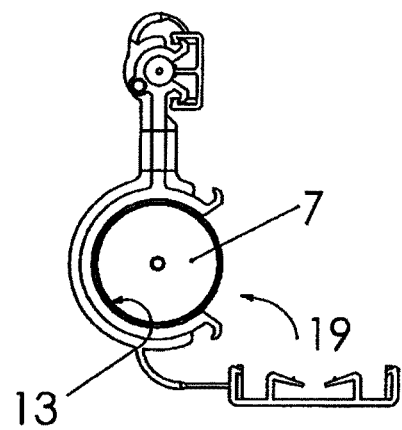
Fig. 4A  Fig. 4B
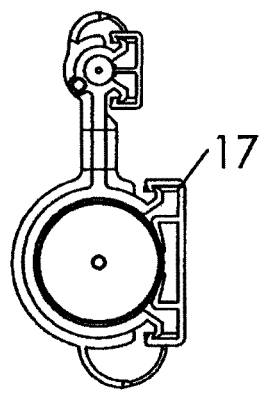
Fig. 4C

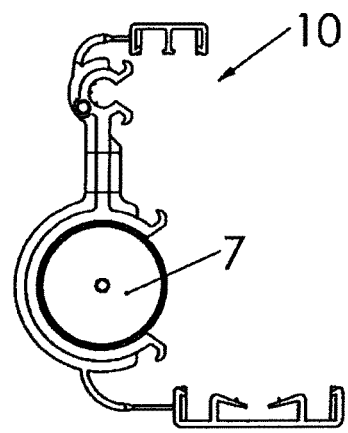
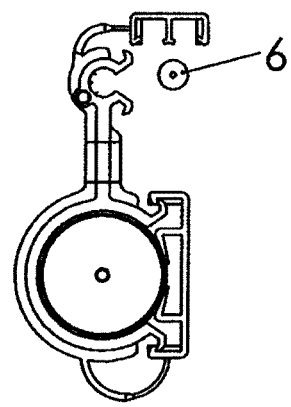
Fig. 5A          Fig. 5B
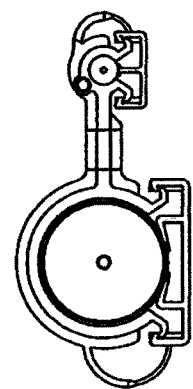
Fig. 5C

PERFECTED DEVICE FOR FIXING ELONGATED BODIES, IN PARTICULAR COAXIAL WIRES, TO A SUPPORTING CABLE

The present invention relates to a device for the fixing of elongated bodies, in particular coaxial wires, to a supporting cable.

The field of the present invention relates to systems used for supporting elongated bodies, such as, for example, coaxial wires used for transmitting electromagnetic signals, in a suspended position beneath a carrying or supporting cable.

Devices are known for this type of application, composed of two half-elements which close on each other, each of which contains a half-seat for the coaxial wire and also a half-seat for the supporting cable. In the use of these known devices, one of the two half-elements is contemporaneously installed on the supporting cable and on the wire, which are therefore already in their operating position from the very beginning of the installation. The other half-element is then closed on the half-element thus prepared and the installation is completed by means of reciprocal tightening screws of the above half-elements.

The drawback of the known embodiment described above mainly lies in the fact that, for the installation of the fixing device, the coaxial wire must already be in its final connecting position to the supporting cable, as the closing of the known device is effected simultaneously or in a single phase on the wire and on the cable supporting it. This creates inevitable difficulties for the installer who, in order to be able to correctly close the two half-elements forming the known device, must hold the coaxial wire and the supporting cable in the exact reciprocal arrangement assigned by the device, i.e. that of the respective seats which are situated in the body of the same. Furthermore, the installation is made even more complex by the necessity of consolidating the closure of the device by means of screws or other similar accessories.

The main objective of the present invention is therefore to provide a perfected device for fixing elongated bodies, in particular coaxial wires, to a supporting cable, which, with respect to the known embodiments described above, is easier to apply.

A further objective of the invention is to provide a fixing device of the type described above which, with respect to the known art, does not require the previous operational positioning of the elongated body with respect to the supporting cable, for its installation.

Another objective of the invention is to provide a fixing device which can be definitively assembled to the supporting cable and respective elongated body without the need for auxiliary means such as screws and the like, in addition to the body of the same.

These and other objectives are achieved with the device of claim 1. Preferred embodiments of the invention are specified in the remaining claims.

With respect to the known art of the fixing devices described above, that of the invention offers the advantage of not requiring the previous perfect positioning of the coaxial wire with respect to the supporting cable, thanks to its characteristic of having distinct or separate means for fixing the device of the invention onto the coaxial wire and onto the cable, respectively.

Another advantage of the device of the invention lies in its autonomy with respect to the application, as it does not require the use of additional means for consolidating the installation.

These and other objectives, advantages and characteristics appear evident from the following description of a preferred embodiment of the device of the invention illustrated, for non-limiting purposes, in the figures of the enclosed drawings.

In which:

FIGS. 1A and 1B represent a front view of the installation method of a known device for anchoring a coaxial wire to the respective supporting cable;

FIGS. 4A, 4B, 4C illustrate the phases of a first installation example of the device of FIGS. 2 and 3; and FIGS. 5A, 5B, 5C illustrate the phases of a second installation example of the device of FIGS. 2 and 3.

Figure 2:
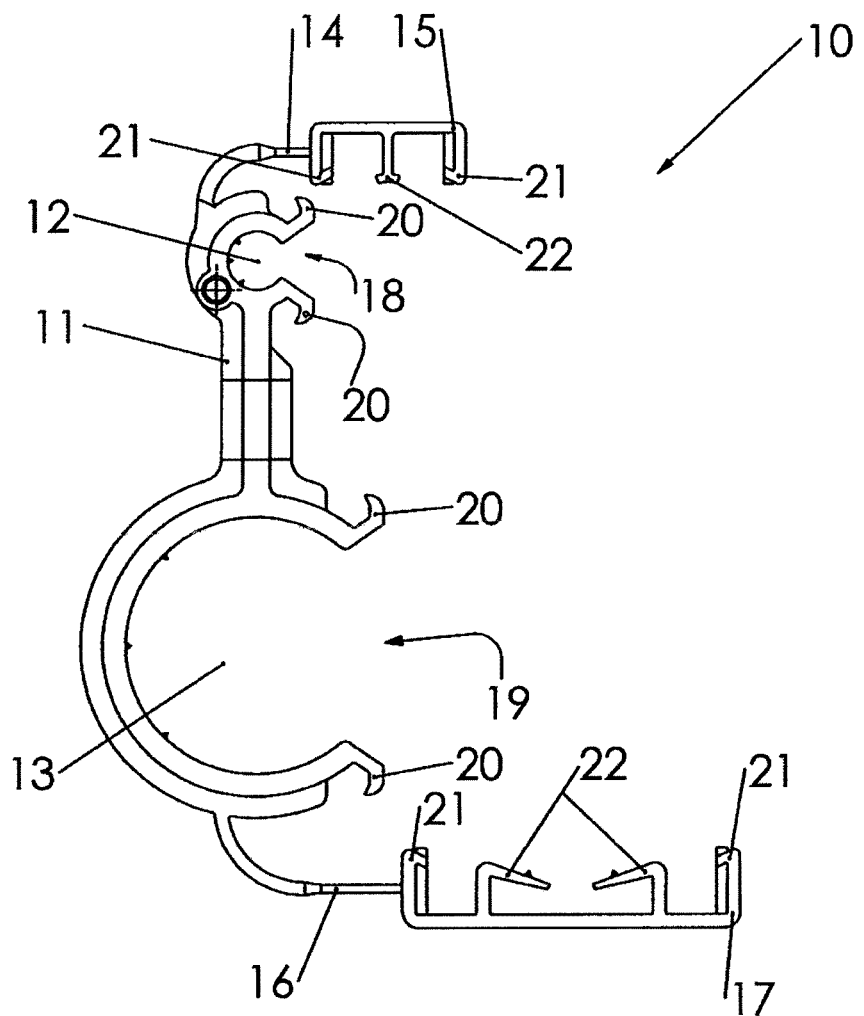
FIGS. 2 and 3 illustrate the device of the invention in a front and perspective view, respectively.

The device of the known art illustrated in FIGS. 1 and 2 is indicated as a whole with 1. It is composed of a first half-element 2 and a second half-element 3, each containing the corresponding half-seats 4 and 5, for the supporting cable 6 and for the elongated body, respectively, in the example illustrated, a coaxial wire for the transmission of electromagnetic signals. The two half-elements 2 and 3 are in turn joined by means of a flexible hinge 8 which, in the embodiment illustrated, is situated on the upper portion of the device 1.

As represented in these figures, the installation of the device 1 requires the previous reciprocal positioning of the cable 6 and wire 7 coinciding with the respective half-seats 4 and 5. It would otherwise not be possible to close the two half-elements 2 and 3 on each other, due to the obstacle created by the body outside the seat of the cable 6 or wire 7. There is also the necessity of having to use screws 9 for reciprocally fixing the two half-elements 2, 3 onto the wire and onto the cable.

Figure 3:
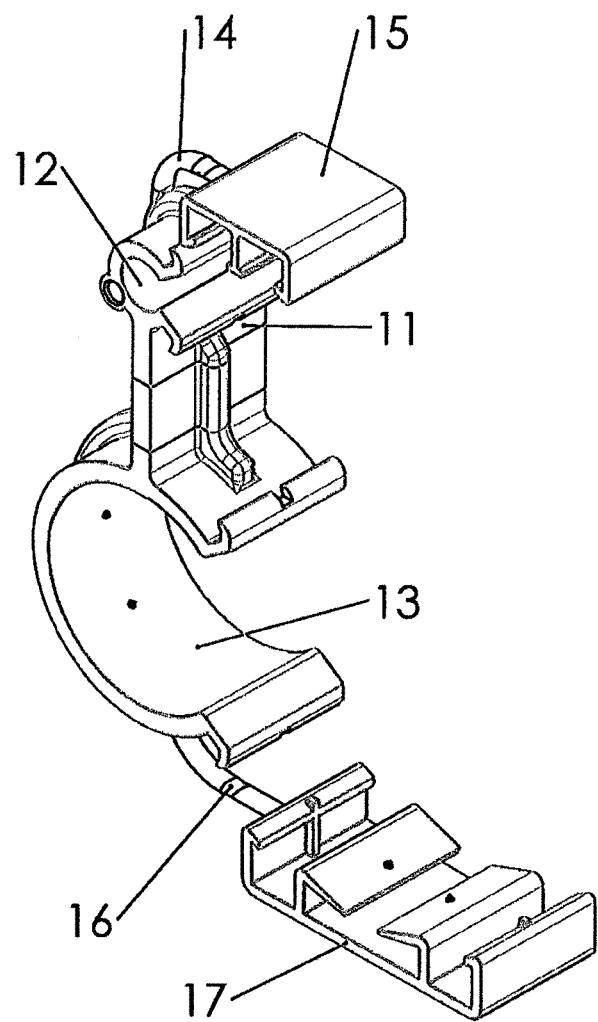

The device 10 of the invention, illustrated in FIGS. 2 and 3, has been produced in order to overcome the drawbacks linked to the traditional necessity of having the wire 7 and cable 6 in an operational position from the very beginning of the installation of the fixing system. Said device 10 consists, in particular, of a body 11 containing a seat 12 for the supporting cable 6 and a separate seat 13 for the coaxial wire 7. The above seats and 13 advantageously have a form corresponding to that of the body of the cable and wire, for whose entry the same seats 12 and 13 have respective openings or entrances 18 and 19. Furthermore, the lid 15 is connected, on the portion of the body 11 containing the seat 12 for the supporting cable 6, by means of a flexible hinge 14, which serves for closing the respective entrance 18 when the cable 6 is housed in the same seat 12. The lid 17, on the other hand, is connected, on the portion of the body 11 containing the seat 13 for the wire 7, by means of a corresponding flexible hinge 16, which serves for closing the respective entrance 19 when the wire is housed in the same seat 13. Consequently, by exploiting the flexible nature of the hinges 14 and 16, the respective lids 15 and 17 can be brought onto the entrance 18 of the seat 12 and onto the entrance 19 of the seat 13. The material of which the same seats 12 and 13 are produced is also sufficiently elastic as to allow the temporary divarication or enlargement of the above entrances 18 and 19, necessary for enabling the forced insertion of the cable 6 and wire 7 inside said seats.

The final closing of the lids 15 and 17 on the respective entrances 18 and 19 is effected by envisaging outer flaps 20 on the latter, in turn suitable for cooperating with corresponding inner flaps 21 positioned on the edges of the lids 15 and 17, also made of a deformable material. Furthermore, as illustrated in FIG. 2, pushing means 22 are envisaged on the internal walls of the lids 15 and 17, suitable for being engaged on the corresponding portion of the walls of the cable 6 and wire 7, thus holding them firmly in an operating position.

In the example represented in FIGS. 4A, 4B, 4C, the supporting cable 6 is previously housed in the respective seat 12 of the device 10, closing the lid 15 on its entrance 18 (FIG. 4A). The wire 7 is then inserted inside its seat 13 (FIG. 4B), closing the respective entrance 19 by means of the lid 17 (FIG. 4C).

In the variant illustrated in FIGS. 5A, 5B, 5C, on the other hand, the anchoring of the device 10 of the invention to the supporting cable 6, is preceded by the anchoring of the device itself to the wire 7, according to the procedures previously described.

It should be noted that, thanks to the invention, the supporting cable 6 and the wire 7 are held on the device 10 without the need for traditional auxiliary means (such as, for example the screws 9 of FIG. 1B), thanks to the action exerted by the respective lids 15 and 17, which form an integrant part of the same device 10.

The invention claimed is:

1. A device for fixing an elongated body to a supporting cable, comprising:
    a body (11) containing a first seat (12) for the supporting cable (6) and a second seat (13) for the elongated body (7);
    separate members that independently close the first and the second seats (12,13), the separate members comprising a first lid (15) for closing the first seat (12) and a second lid (17) for closing the second seat (13);
    a first flexible connecting hinge (14) coupling the first lid (15) to a first outer end of the body (11), and a second flexible connecting hinge (16) coupling the second lid (17) to a second outer end of the body (11), the first and the second outer ends being in opposite positions of the body;
    a first entrance (18) for insertion of the supporting cable (6) onto the first seat, and a second entrance (19) for insertion of the elongated body (7) onto the second seats (12,13);
    first inner flaps (21) extending from opposing edges of the first lid and second inner flaps extending from opposing edges of the second lid, and first outer flaps (20) extending from opposing edges of the first entrance and second outer flaps extending from opposing edges of the second entrance (18,19),
    wherein the first and respectively the second outer flaps (20) and the first and respectively the second inner flaps (21) engage one another when the first and respectively the second lid are disposed over the first and respectively the second entrance, thereby securing the first and respectively the second lid on the first and respectively the second entrance;
    a first pushing member and respectively a second pushing members extending from an inner wall of the first and respectively the second lid, the first and the second pushing members blocking the supporting cable and respectively the elongated body in position inside the first and respectively the second seat,
    wherein the second pushing member comprises parallel walls and lips extending inwardly from the parallel walls, each of the lips having a free end, thereby adapting the second pushing member to elongated bodies of different diameters.

2. The device according to claim 1, wherein the inwardly facing lips are spaced from one another by a longitudinal gap.

3. The device according to claim 1, wherein the first pushing member comprises a member extending from the first lid and having arms extending therefrom.

* * * * *